United States Patent
Richards et al.

(10) Patent No.: US 6,261,037 B1
(45) Date of Patent: *Jul. 17, 2001

(54) CONNECTOR ASSEMBLY

(75) Inventors: Darrell R. Richards, Mt. Vernon, TX (US); William Thornton, Suhlendorf (DE); Bryan C. Baker, Houston, TX (US); Bernard F. Casteran, Paris (FR); Cavin Foord, Peterborough (GB)

(73) Assignee: Drilltec Patents & Technologies Company, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,574

(22) Filed: Jul. 22, 1998

Related U.S. Application Data

(63) Continuation-in-part of application No. 08/900,458, filed on Jul. 25, 1997, now abandoned.
(60) Provisional application No. 60/084,432, filed on May 6, 1998.

(51) Int. Cl.[7] ...................................................... B60P 7/12
(52) U.S. Cl. ............................... 410/36; 410/40; 410/42
(58) Field of Search .................................. 410/36, 42, 32, 410/34, 39, 40; 211/59.4, 60.1, 70.4; 206/443, 446; 248/68.1

(56) References Cited

U.S. PATENT DOCUMENTS

| | | | |
|---|---|---|---|
| 1,793,059 | * | 2/1931 | Chambers .............................. 410/36 |
| 2,248,119 | * | 7/1941 | Reed et al. ........................ 410/36 X |
| 2,849,027 | * | 8/1958 | Tetyak ................................ 410/42 X |
| 4,270,872 | | 6/1981 | Kiyosawa .............................. 403/170 |
| 4,572,692 | | 2/1986 | Sauber ................................... 403/16 |
| 4,595,323 | * | 6/1986 | Howard ................................. 410/36 |
| 4,706,822 | * | 11/1987 | Remp, Jr. et al. ............... 206/443 X |
| 5,123,547 | | 6/1992 | Koch . |
| 5,267,648 | * | 12/1993 | Baker .................................. 206/446 |
| 5,516,244 | * | 5/1996 | Baker .................................... 410/36 |
| 5,755,541 | * | 5/1998 | Suarez ................................... 410/36 |

FOREIGN PATENT DOCUMENTS

| | | |
|---|---|---|
| 19544569 | 6/1997 | (DE) . |
| 0716030 | 1/1996 | (EP) . |
| 2187812 | 10/1986 | (GB) . |

* cited by examiner

Primary Examiner—Stephen T. Gordon
(74) Attorney, Agent, or Firm—Conley, Rose & Tayon, P.C.

(57) ABSTRACT

An apparatus for carrying one or more elongated members includes at least two elongated member support members, each support member having ends and at least one elongated member carrier surface disposed between the ends. The apparatus also includes a support member connection assembly including an elongated connector and at least one connector sleeve engageable with the elongated connector and an end of a support member.

22 Claims, 6 Drawing Sheets

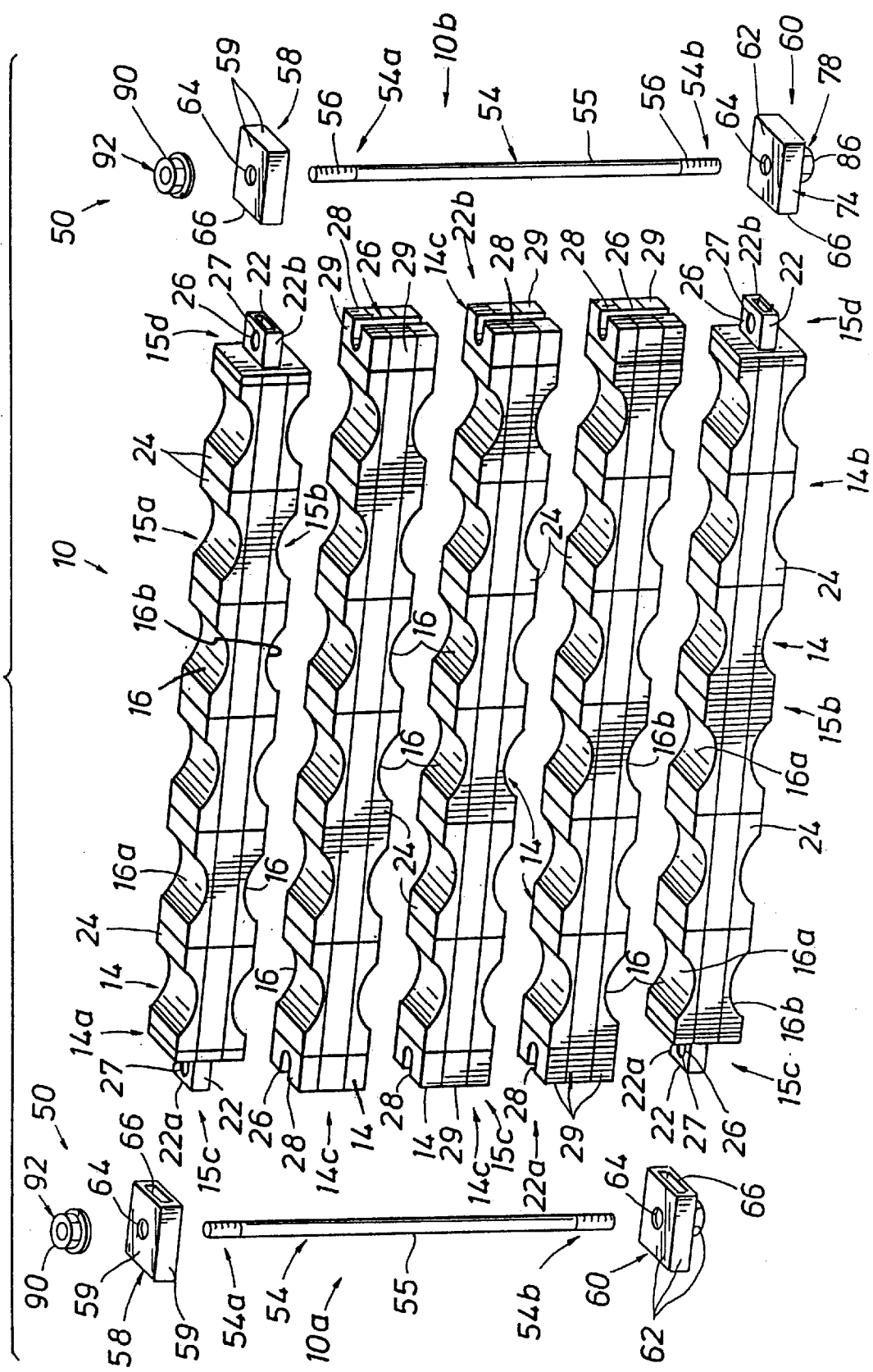

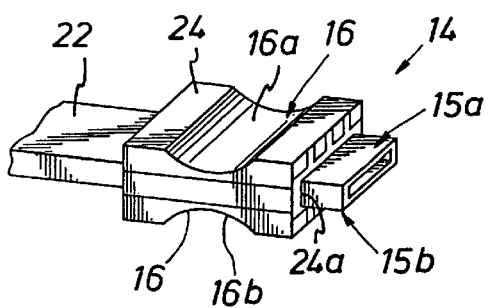
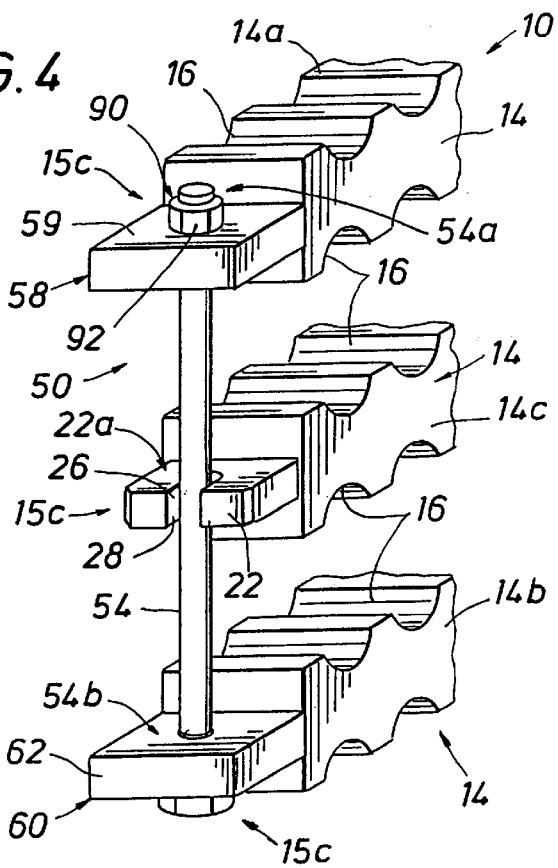
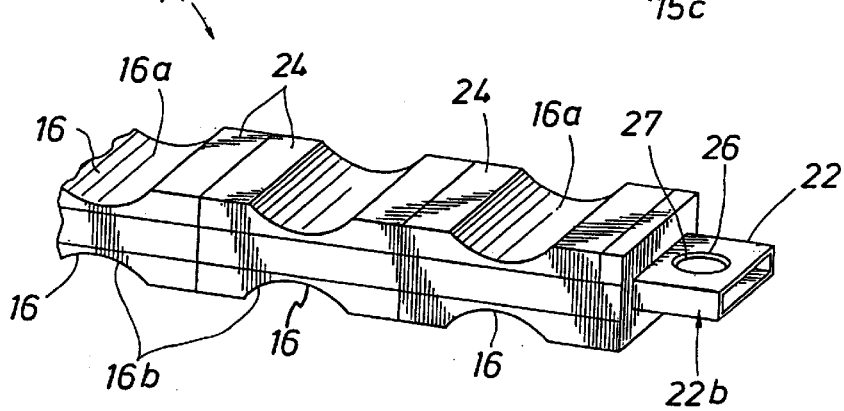

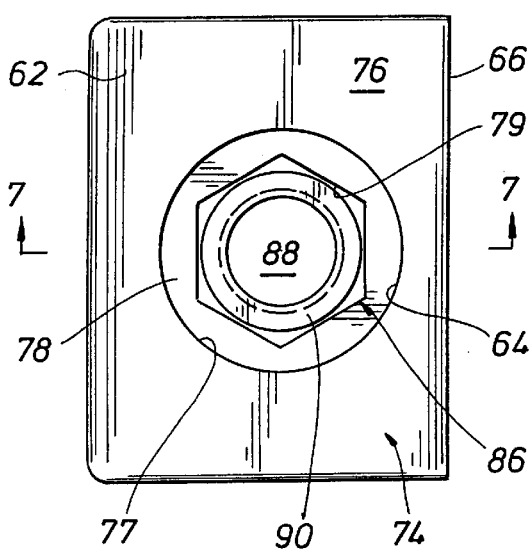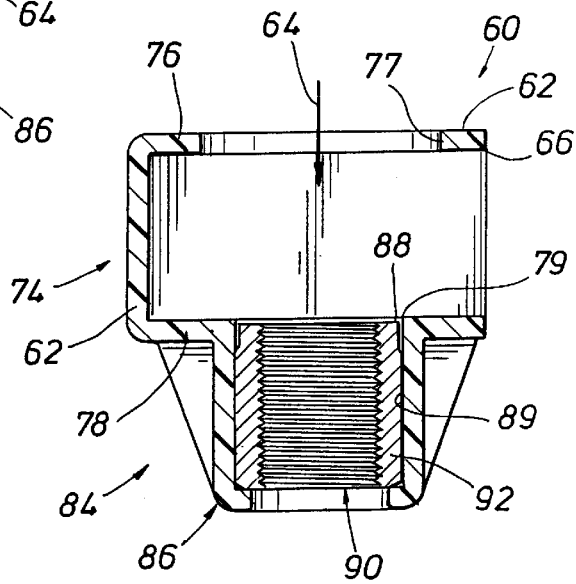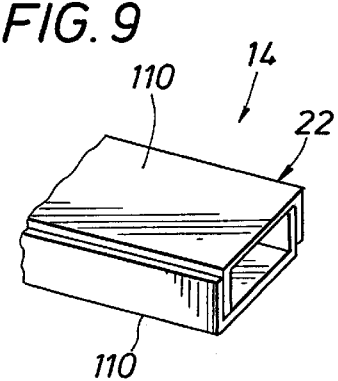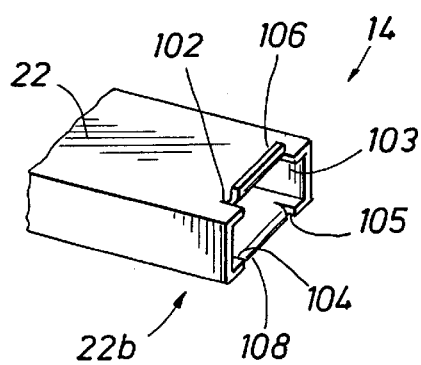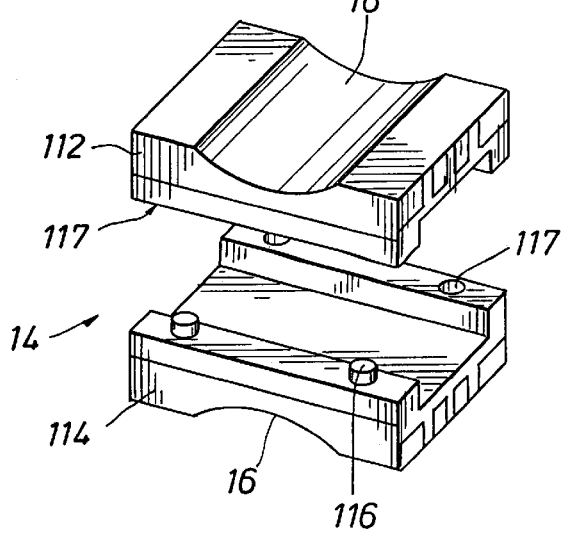

CONNECTOR ASSEMBLY

The present application is a continuation-in-part of U.S. application Ser. No. 08/900,458, filed Jul. 25, 1997 now abandoned, entitled "Equipment for and Method of Storing and Shipping Pipe, and claims the benefit of U.S. Provisional Application Serial No. 60/084,432 filed May 6, 1998 entitled "Connector Sleeve for Pipe Holder," both of which are incorporated by reference herein.

STATEMENT REGARDING FEDERALLY SPONSORED RESEARCH OR DEVELOPMENT

Not applicable.

BACKGROUND OF THE INVENTION

The present invention relates to equipment for and methods of holding elongated members. In another aspect, the present invention relates to equipment for and methods of storing and shipping elongated members. In even another aspect, the present invention relates to equipment for and methods of storing and shipping pipes. In still another aspect, the present invention relates to equipment for and methods of securing several supports together.

Various types of elongated members, including but not limited to piping and tubing, are used in construction projects and other activities, such as petroleum drilling and delivery operations. After manufacture, elongated members must be packaged, stored and/or transported. The ability to effectively package, store and transport elongated members can save substantial time and expense, directly impacting the economy and efficiency of the project. It is thus desirable to have equipment for and methods of effectively packaging, storing and transporting elongated members without damaging the elongated members. Further, it is desirable that such equipment be versatile, long lasting, reliable, quick and/or easy to use.

Numerous prior art systems for storing pipes are discussed in U.S. Pat. No. 5,123,547 issued on Jun. 23, 1992 to Koch (the '547 patent), which has a common assignee with the present application and is incorporated by reference herein in its entirety. The '547 patent discloses equipment for storing and shipping pipes that includes several superposed pipe supports. The illustrated pipe supports include numerous support surfaces on opposite sides acting as rests for several pipes. A plurality of pipes can thus be layered between the pipe supports, effecting a vertical stacking of pipes having pipe supports interposed between the layers of pipes.

The pipe supports shown in the '547 patent are securably held together by applying one or more steel or nylon bands, or by a tightening frame. The tightening frame of FIG. 3 of the '547 patent includes upper and lower U-channels 20, 22 that may be laterally tightened relative to each other with a pair of threaded rods 24, 26. The rods 24, 26 may be pivotably engaged within the lower U-channel and secured with nuts to the upper U-channel.

In the embodiment of FIG. 7 of the '547 patent, the uppermost and lowermost pipe supports instead include projecting parts 82, 84, 86, 88 that are engageable with a pair of threaded rods 96. At one end, each rod includes a molding 98 that is engageable with one of the lower projecting parts 82, 84. The other end of each rod 96 can be passed through a vertical borehole 94 in an upper projecting part 86, 88 and secured with a nut 106.

While '547 patent materially advances the prior art, there is a need for yet further improved equipment and methods for holding, storing and transporting elongated members. For example, the prior art equipment does not provide metal-to-metal contact buffers at substantially all locations on the equipment that may come in contact with the elongated members. Contact at these locations with elongated members, such as during loading, assembly, or transport of the equipment and elongated members, could lead to deterioration, such as rusting or galvanic corrosion, of, or otherwise damage, the elongated members, making them unusable. For another example, there may be metal-to-metal contact between the outer facing components of prior art equipment and other metal objects, such as other similar sets of equipment and elongated members. Such metal-to-metal contact can result in galvanic corrosion and other damage, decreasing the effectiveness and useful life of the equipment. For yet another example, prior art systems, such as the tightening frame of FIG. 3 of the '547 patent, require additional substantial components, such as the U-channels of FIG. 3.

Thus, there remains a need for improved equipment for and methods of packaging, storing and/or transporting elongated members that will not significantly damage or cause deterioration to elongated members or other metal objects upon contact with the equipment. There also remains a need for improved equipment for connecting numerous support members together. Preferably, the equipment and methods can be simple and quick to utilize. Ideally, the equipment would be sturdy, versatile, long lasting and reliable. Especially well received would be equipment that does not require substantial additional components.

These and other needs in the art will become apparent to those of skill in the art upon review of this patent specification, claims and drawings.

BRIEF SUMMARY OF THE INVENTION

In accordance with the present invention, there is provided an apparatus for carrying one or more elongated members that includes at least two elongated member support members and a support member connection assembly. Each support member has ends and at least one elongated member carrier surface disposed between the ends. The support member connection assembly includes an elongated connector and at least one connector sleeve that is engageable with the elongated connector and an end of a support member.

Another apparatus made in accordance with the present invention and capable of holding one or more metallic members includes at least two supports and at least one connector engageable with the supports. The supports and connector are each constructed at least partially of metallic material. The supports and connector at least partially surround the metallic members. The apparatus also includes at least one covering at least partially of non-metallic material disposed upon the supports and capable of preventing metal-to-metal contact between the supports and the metallic members at the location of the covering. The supports may include upper and lower sides and opposing ends, and the covering(s) may be disposed upon the upper and lower sides of the supports, the opposing ends of the supports, or any combination thereof. The covering may be constructed of polyethylene material.

An assembly may be made in accordance with the present invention that is capable of holding one or more elongated members constructed at least partially of metallic material. This assembly includes at least two elongated member supports constructed at least partially of metallic material and an elongated connector. The supports have ends with apertures therethrough. Also included is a plurality of sleeves constructed at least partially of non-metallic material capable of being received over the ends of the supports. Each sleeve has at least one opening capable of alignment with one or more of the apertures. The elongated connector is extendable through the apertures and the openings and is capable of securing the supports. At least one of the sleeves may include a connector lock engageable with the elongated connector. Further, the connector lock may be a nut supported in the sleeve in a non-rotational manner.

An apparatus may be made in accordance with the present invention that is capable of connecting a threaded rod and a nut to a support member having a passage. This apparatus includes a body having an opening capable of receiving the support member and an aperture capable of receiving the rod. The apparatus also includes an extending portion connected to the body and having a cavity accessible through the aperture. The cavity is capable of housing the nut in alignment with the passage of the support member. The extending portion has one or more surfaces engageable with the nut to prevent the nut from rotating within the cavity. The body and the cavity may be constructed at least partially of non-metallic material. The surfaces may be flats formed by the cavity. The extending portion may be formed of a material that will not substantially deform under the torque required to connect the threaded rod and the nut to the support member. The extending portion may be constructed of polyethylene. The extending portion may include at least one reinforcing portion.

A method of holding elongated members in accordance with the present invention involves the use of at least two elongated member supports and a connection assembly, each support member having top and bottom sides and at least one elongated member carrier surface on at least one side, each support member also having left and right ends and at least one aperture at each end, the connection assembly including a connector and upper and lower sleeves, the upper and lower sleeves each having a passage, the lower sleeve including a locking member. The method includes positioning the support members in generally parallel vertical alignment. One or more of the elongated members are positioned between opposing carrier surfaces of adjacent support members. The upper sleeve is positioned upon an end of the uppermost support member, and the passage of the upper sleeve is aligned with the corresponding aperture of the uppermost support member. Similarly, the lower sleeve is positioned upon an end of the lowermost support member and the passage of the lower sleeve is aligned with the corresponding aperture of the lowermost support member. An end of the connector is passed through the passages of the upper and lower sleeves and corresponding apertures of the support members and engaged with the locking member of the lower sleeve.

Accordingly, the present inventions comprise various combinations of features and advantages which enable it to substantially advance the technology associated with equipment and methods for holding elongated members, and support member connectors. The present invention includes equipment for and methods of packaging, storing and/or transporting elongated members that will not significantly cause deterioration, rusting or other damage to elongated members or other metal objects upon their contact with outer facing surfaces or components of the equipment. The present invention also includes improved equipment for connecting numerous support members together. The equipment and methods of the present invention may be configured to be simple and quick to utilize. Embodiments of the present invention include equipment that is sturdy, versatile, long lasting and reliable. Further, embodiments of the present invention may be configured not to require substantial additional components.

The characteristics and advantages of various embodiments of the present invention described above, as well as additional features and benefits, will be readily apparent to those skilled in the art upon reading the following detailed description, referring to the accompanying drawings and reading the appended claims.

BRIEF DESCRIPTION OF THE DRAWINGS

For a description of preferred embodiments of the invention, reference will now be made to the accompanying drawings wherein:

FIG. 1 is an exploded view of an embodiment of an elongated member holding system made in accordance with the present invention;

FIG. 2 is a detailed view of one embodiment of a support member having a saddle member made in accordance with the present invention;

FIG. 3 is a detailed view of an embodiment of a support member having numerous saddle members made in accordance with the present invention;

FIG. 4 is an isometric view of one embodiment of a holding system having a connection assembly engaging upper, intermediate and lower support members made in accordance with the present invention;

FIG. 5 is an isometric view of another embodiment of a support member of a holding system of the present invention;

FIG. 6 is a top view of one embodiment of a lower connector sleeve of a connection assembly made in accordance with the present invention;

FIG. 7 is a cross-sectional view of the lower connection sleeve of FIG. 6 taken at plane 7—7;

FIG. 8 is a detailed view of another embodiment of a support member of a holding system of the present invention;

FIG. 9 is a detailed view of yet another embodiment of a support member of a holding system of the present invention;

FIG. 10 is a detailed view of still another embodiment of a support member of a holding system of the present invention;

DETAILED DESCRIPTION OF PREFERRED EMBODIMENTS

Figure 12:
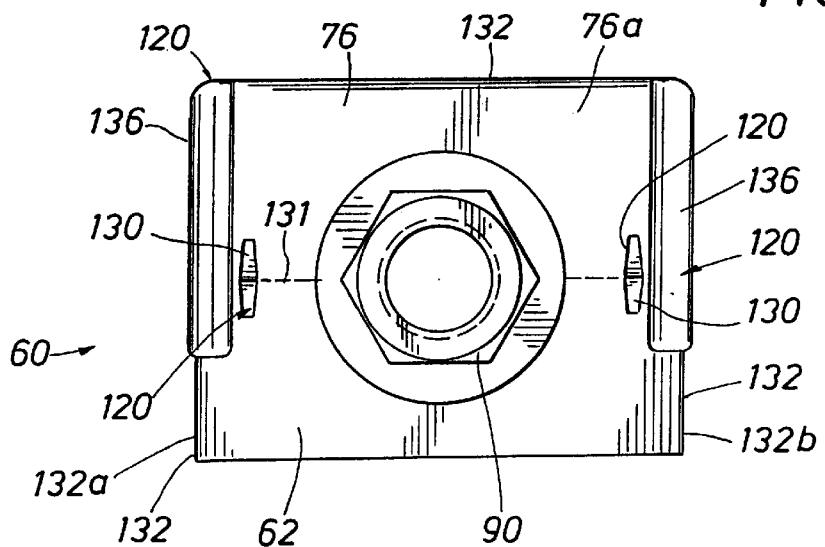
FIG. 12 is a top view of the lower connector sleeve of FIG. 11.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

Referring initially to FIG. 1, an elongated member holding system 10 made in accordance with the present invention includes two or more elongated member support members 14 and at least one support member connection assembly 50. The holding system 10 is capable of holding, or securing, one or more elongated members 12 (FIG. 16) and can be used for storing and transporting the elongated members 12. In addition, two or more holding systems 10 can be used together for holding the elongated members 12, the multiple holding systems 10 being engaged with the elongated members 12 in spaced relationship as desired (not shown) along the length of the elongated members 12.

Referring now to FIG. 2, each support member 14 includes at least one elongated member carrier surface 16 suitable for receiving or seating an elongated member 12. Further, the support member 14 may have at least one upper carrier surface 16a and at least one lower carrier surface 16b, the surfaces 16a, 16b disposed on opposing sides 15a, 15b of the support member 14. In addition, each support member 14 may include numerous adjacent carrier surfaces 16a and 16b, such as shown in FIG. 3. The carrier surfaces 16 may be shaped as desired to complement, hold or engage a particular type or size of elongated member 12. For example, surfaces 16 may be arcuate so as to conform to cylindrical shaped elongated members 12, such as pipe. It should be understood, however, that the present invention is not limited to any particular size, shape, quantity or configuration of carrier surfaces 16.

The support members 14 may be constructed in any manner, configuration, shape and design suitable for use with the present invention. For example, in one embodiment, such as shown in FIG. 2, the support member 14 includes a one-piece substantially hollow rectangular bar 22 that carries one or more saddle members 24. Each saddle member 24 is a one-piece integrally formed component having a passage 24a for receiving the bar 22, such as by sliding engagement of the saddle member 24 and bar 22. Each saddle member 24 has one or more carrier surfaces 16. The saddle member(s) 24 may be configured on the bar(s) 22 in any desired configuration. For example, the support member 14 of FIG. 3 has numerous saddle members 24 disposed in adjacent, abutting relationship on the bar 22.

The support members 14 may be formed of any material or combination of materials suitable for use with the present invention. The support member material 14 may be selected depending upon characteristics, such as weight, shape and material, of the elongated members 12 to be held. For example, the support members 14 may be constructed at least partially of a sturdy, durable material, such as metal or metal alloy, that enables the support member 14 to support a plurality of elongated members 12 during storage and transporting. Other concerns, such as avoiding galvanic corrosion, rusting and other deterioration or damage to elongated members 12 may also lead to the selection of particular materials, or coatings, for the support members 14, such as thermoplastic, thermoset or elastomeric material.

In particular, the carrier surfaces 16 of the support members 14 may be formed of, or coated, with a material that will not cause galvanic corrosion and other forms of deterioration to the elongated members 12, or undue damage to the elongated members 12 resulting from contact therewith. If the elongated members 12 are steel, for example, possible carrier surface materials include non-metallic materials that are softer than steel, such that contact between the carrier surface 16 and an elongated member 12 will not substantially damage the elongated member 12. The embodiment of the support members 14 of FIG. 1 preferably includes bars 22 that are constructed of galvanized steel and saddle members 24 (and carrier surfaces 16) constructed of high density polyethylene. The saddle members 24 completely surround the upper and lower surfaces 15a, 15b of the support members 14 except at ends 15c, 15d, thus preventing metal-to-metal contact between the support members 14 and other objects, such as the elongated members 12, along the upper and lower surfaces 15a, 15b, except at ends 15c, 15d.

Referring now to FIGS. 4 and 5, the holding system 10 includes an upper support member 14a and a lower support member 14b, and may include one or more intermediate support members 14c. Each support member 14 has ends 15c, 15d, and each end 15c, 15d includes a passageway 26 that allows interconnection with the connection assembly 50. Multiple support members 14 having numerous carrier surfaces 16, may be configured in vertical alignment, such as shown in FIG. 1, to allow the holding system 10 to hold a plurality of elongated members 12.

Referring again to FIG. 1, the connection assembly 50 generally includes a connector 54 having ends 54a, 54b with threads 56, an upper connector sleeve 58 and a lower connector sleeve 60. Each sleeve 58, 60 includes a passage 64. The upper sleeve 58 is engageable with an end 15c, 15d of upper support member 14a, while the lower sleeve 60 is engageable with an end 15c, 15d of lower support member 14b, such that the passageways 26 of support members 14a, 14b are alignable with the corresponding passages 64 of sleeves 58, 60. The connector 54 is sized to pass through the passageways 26 of all of the support members 14 and the passages 64 of the upper and lower sleeves 58, 60, and is firmly securable thereto in any suitable manner as is or becomes known in the art. The connection assembly 50 thus serves to connect the support members 14 and rigidly hold the support members 14 and elongated members 12 (FIG. 16) for storage and/or transportation.

The connection assembly 50 may be designed such that the sleeves 58, 60 are the outer facing components of the holding system 10 on sides 10a, 10b, and are constructed at least partially, and preferably entirely, of non-metallic material to serve one or more among various purposes. For example, the sleeves 58, 60 could serve as metal-to-metal buffers between the ends 15c, 15d of the support members 14 and metal objects, not causing galvanic corrosion, rusting and/or other deterioration thereto, or damage to the metal objects, such as elongated members 12, upon contact therewith. Furthermore, the lower sleeve 60 may be designed to secure, hold or include a locking member 50 matable with the lower end 54b of the connector 54. For example, the locking member 50 may be integrally formed into or carried by the lower sleeve 60 such that the lower sleeve 60 prevents undesirable movement of the locking member 50.

With respect to the particular embodiment shown in FIGS. 1 and 3, for example, the passageways 26 of the support members 14 are formed into the ends 22a, 22b of the bars 22 that extend laterally at the support member ends 15c, 15d, respectively. The passageways 26 of the upper and lower support members 14a, 14b are holes 27 formed in the bars 22, while the passageways 26 of the intermediate support member(s) 14c are U-shaped openings 28 (FIG. 4). The intermediate support members 14c may include end reinforcement members 29 (FIG. 1) also having U-shaped openings 28 and which are connectable to the bars 22 at ends 22a, 22b. The upper and lower sleeves 58, 60 (FIGS. 1, 7) are preferably constructed at least partially of material that will not cause substantial damage, deterioration, corrosion or rust to elongated members 12 or other metal objects if contacted therewith. For example, the sleeves 58, 60, or respective sleeve outer surfaces 59, 62, may be constructed at least partially of a non-metallic material that is softer than metal, such that contact with metal elongated members 12 or other metallic materials will not cause substantial damage or deterioration, such as rust, thereto. If the elongated members 12 are steel, such materials may include thermoplastic, thermoset or elastomeric material. In the preferred embodiment of FIG. 1, the sleeves 58, 60 are constructed of high density polyethylene material. In another embodiment, the sleeves 58, 60 may be constructed of between about 60%–80% nylon material and between about 20%–40% glass material, such as about 70% nylon material and about 30% glass.

The upper sleeve 58 of the particular embodiment of FIG. 1 has a bore 66 that enables the sleeve 58 to be slideably positionable over an end 15c, 15d of an upper support member 14a. The lower sleeve 60, best shown in FIGS. 6 and 7, includes an upper portion 74 and a lower portion 84. The upper portion 74 includes bore 66 and is thus removably engageable with an end 15a, 15b of the lower support member 14b (FIG. 1). Opposing top and bottom walls 76, 78 of the upper portion 74 have aligned openings 77, 79, respectively, which form the passage 64, allowing the connector 54 (FIG. 1) to pass through the upper portion 74. The lower portion 84 includes a generally cup-shaped portion 86 that extends from the bottom wall 78 of the upper portion 74 and at least partially surrounds the opening 79 in the bottom wall 78. The generally cup-shaped portion 86 includes a cavity 88 for carrying a locking member 90, as will be described further below.

The connector 54 of the specific embodiment of FIG. 1 has a diameter and length suitable to pass through the holes 27 of the support members 14a, 14b, the passages 64 of the sleeves 58, 60 and the U-shaped openings 28 of the intermediate support members 14c. The connector 54 is constructed of a material of sufficient strength and other characteristics that enables it to effectively secure and transport the support members 14 and elongated members 12 carried therebetween. One embodiment of the connector 54 is a galvanized steel rod 55.

Still referring to the particular embodiment of FIG. 1, the connector 54 is matable at each end 54a, 54b with a locking member 90. The locking member 90 (FIG. 7) that is engageable with the lower end 54b of the connector 54 may be associated with the lower sleeve 60. For example, the illustrated locking members 90 are commercially available nuts 92 that are each engageable with a male threaded end 54a, 54b of the connector 54. The locking member 90 connectable to the lower end 54b of the connector 54 is shown in FIGS. 6 and 7 disposed within the generally cup-shaped portion 86 of the lower sleeve 60. The cavity 88 of the generally cup-shaped portion 86 of the lower sleeve 60 has internal walls 89 (FIG. 7) preferably formed to contain the locking member 90 and prevent it from rotating within the generally cup-shaped portion 86. For example, if the locking member 90 has an external octagon shape, then internal walls 89 shall also be octagon-shaped to receive the octagon shaped locking member 90, whereby the flats on the locking member 90 engage the walls 89 to prevent the rotation of member 90 within the cavity 88, or lower sleeve 60. Further, the locking member 90 may be inserted into the generally cup-shaped portion 86 of the embodiment of FIG. 1 during or shortly after the manufacture or formation of the generally cup-shaped portion 86, allowing the cup-shaped portion 86 to shrink onto or mold around the locking member 90, enhancing its close engagement therewith. It should be understood, however, that the locking members 90 may take other suitable forms. Further, the locking member 90 for the lower end 54b of the connector 54 may instead be integrally formed in, or otherwise connected or associated with, the lower sleeve 60.

The present invention is not limited to the above-described configurations. In the embodiment of FIG. 8, for example, the support member 14 may include a bar 22 having cutouts 102, 103, 104 and 105 at ends 22a, 22b and bent lips 106, 108. For another example, such as shown in FIG. 9, the bar 22 of each support member 14 may be formed with two opposing channel-like members 110. In the embodiment of FIG. 10, the support member 14 is formed by joining upper and lower C-shaped molded halves 112, 114 having carrier surfaces 16 formed therein. One of the molded halves 114 contains at least one short projection 116 that mates with a matching blind hole 117 provided on the other molded half 112. In yet another example, such as shown in FIG. 5, each support member 14 may be a single integrally formed component 118 having at least one carrier surface 16.

Figure 11:
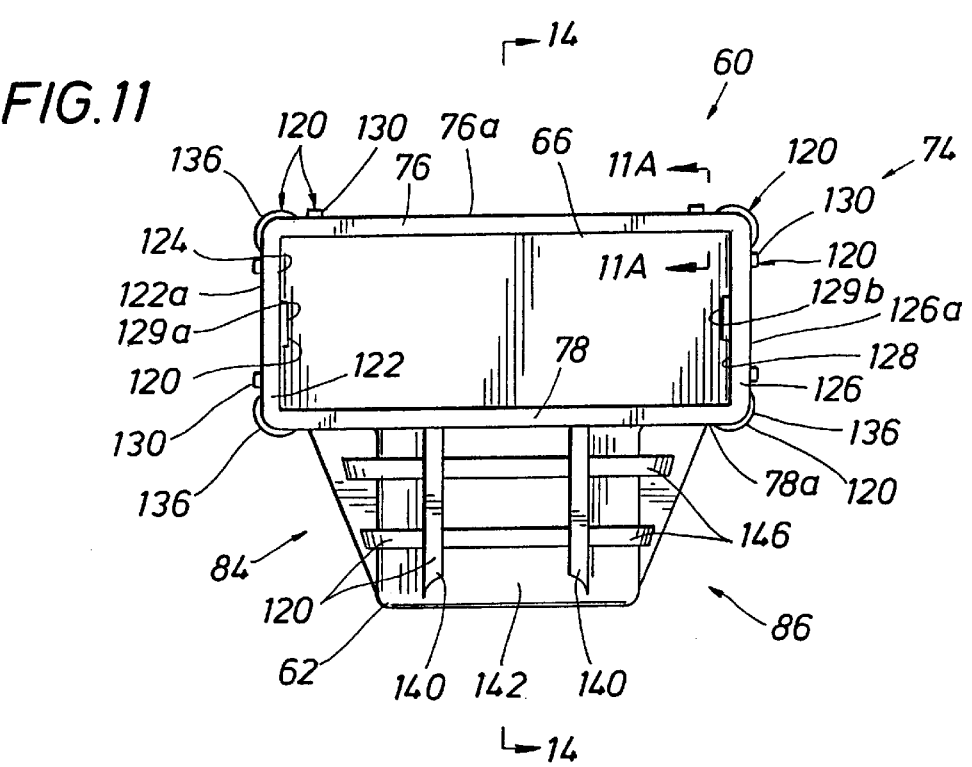
FIG. 11 is a side elevation view of another embodiment of a lower connector sleeve of a connection assembly made in accordance with the present invention.

Furthermore, the upper and lower sleeves 58, 60 (FIG. 1) may have alternate configurations or additional features. FIGS. 11–14 shown various additional features of the lower sleeve 60. Referring to FIG. 11, the upper portion 74 of the lower sleeve 60 may be at least partially reinforced, such as with reinforcing members 120, for reinforcing, strengthening and/or preventing cracking or deformation of the sleeve 60. If reinforcing members 120 are used on the upper portion 74, the reinforcing members 120 may take any suitable form for use with the present invention. For example, the opposing interior surfaces 124, 128 of upper portion side walls 122, 126 forming the bore 66 may include reinforcing members 120, such as for the purpose of supporting or reinforcing the sleeves 60 at locations of engagement with the support members 14 (FIG. 1). The particular such reinforcing members 120 shown in FIGS. 11 and 14 are ribs, or runners, 129a, 129b extending at least partially along the length of surfaces 124, 128, respectively. The illustrated runners 129a, 129b are rectangular shaped protrusions that are integrally formed as part of the walls 122, 126.

Figure 11A:
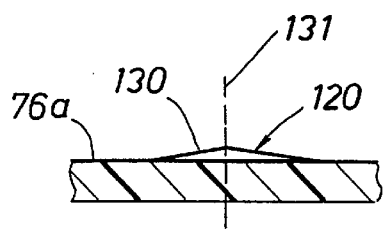
FIG. 11a is a partial cross-sectional view of the sleeve of FIG. 11 taken at plane 11A—11A showing a boss type reinforcing member made in accordance with the present invention.

For another example still referring to FIG. 11, the respective outer surfaces 76a, 78a, 122a, 126a of walls 76, 78, 122 and 126 of the upper portion 74 may include reinforcing members 120 of any suitable form capable of assisting in reinforcing or maintaining the structural integrity or shape of the upper portion 74. These reinforcing members 120 of the embodiment of FIGS. 11 and 12 are bosses 130 that are disposed upon and extend from surfaces 76a, 122a, and 126a. Two bosses 130 are shown in spaced relationship disposed across the knit line 131 (FIGS. 11A, 12) on each surface 76a, 122a and 126a.

Figure 13:
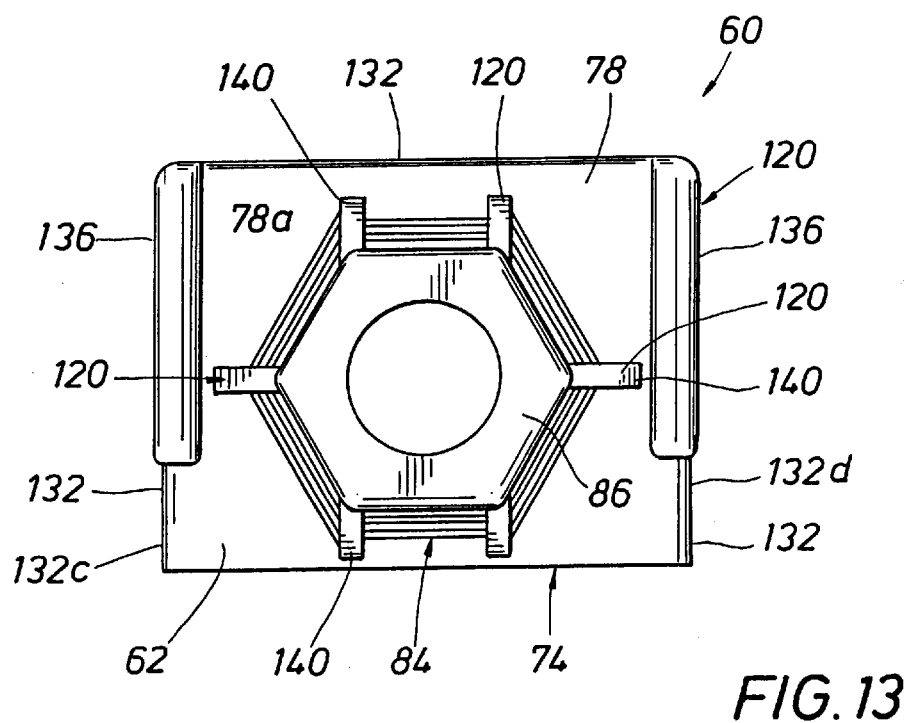
FIG. 13 is a bottom view of the lower connector sleeve of FIG. 11.
Figure 14:
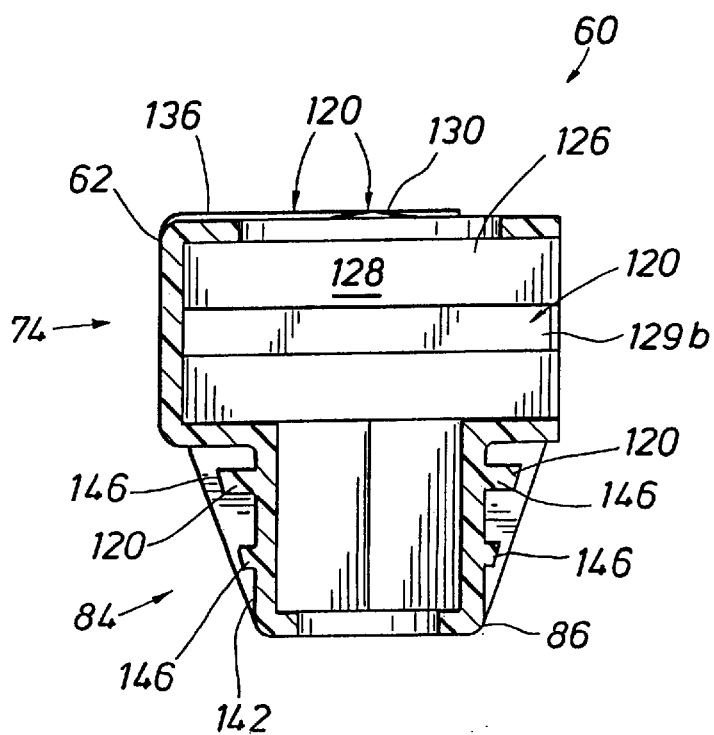
FIG. 14 is a cross-sectional view of the lower connector sleeve of FIG. 11 taken at plane 14—14.

For yet another example, referring to FIGS. 11–13, reinforcing members 120 in any suitable form may be disposed at least partially upon one or more of the outer edges 132 (FIGS. 12, 13) of the upper portion 74 of the lower sleeve 60, the outer edges 132 being potential weight bearing stress locations. The reinforcing members 120 of the particular embodiment of FIGS. 11–13 are built-up portions 136 disposed upon and extending substantially along the length of side edges 132a, 132b, 132c and 132d.

Now referring to FIGS. 11, 13 and 14, the lower portion 84 of the lower sleeve 60 may also be reinforced, such as with the use of reinforcing members 120, to assist in reinforcing, strengthening and/or assisting in maintaining the structural integrity, or shape, of the lower sleeve 60. The reinforcing members 120 on the lower portion 84 may also take any suitable form for use with the present invention. The cup-shaped portion 86 of the lower portion 84 may be at least partially reinforced, such as to assist in preventing it from deforming during use and/or to assist in preventing the locking member 90 (FIG. 12) from rotating therein. In the embodiment of FIGS. 11 and 13, for example, there are shown reinforcing members 120 that are vertical support members, or arms, 140 extending between the outer surface 142 of the cup-shaped portion 86 and the upper portion 74. Further, FIGS. 11 and 14 show numerous reinforcing members 120 that are horizontal ribs 146 extending at least partially around the outer surface 142 of the cup-shaped portion 86. Another embodiment may have either vertical support members 140 or horizontal ribs 146. It should thus be understood that one or more, or none, of of the above additional features may be included. In addition, when one or more such features are included, the present invention does not require the particular embodiments of such features shown in the referenced figures and described above.

Figure 16:
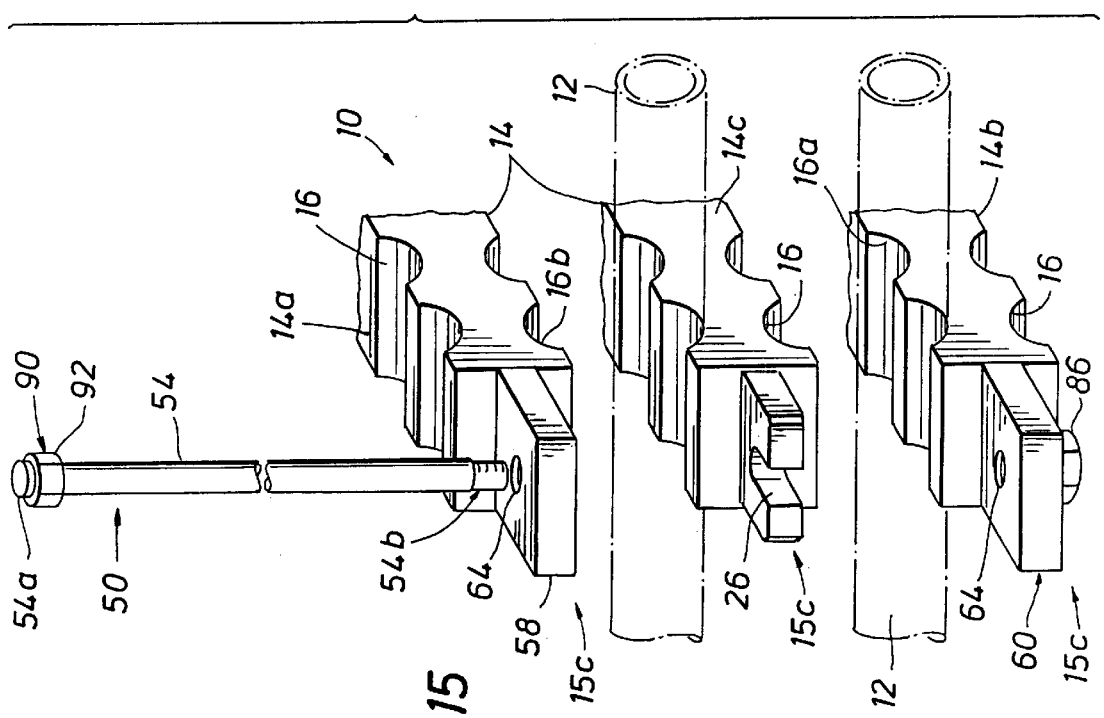
FIG. 16 is a detailed exploded view of the holding system of FIG. 15 showing elongated members disposed therein.
Figure 15:
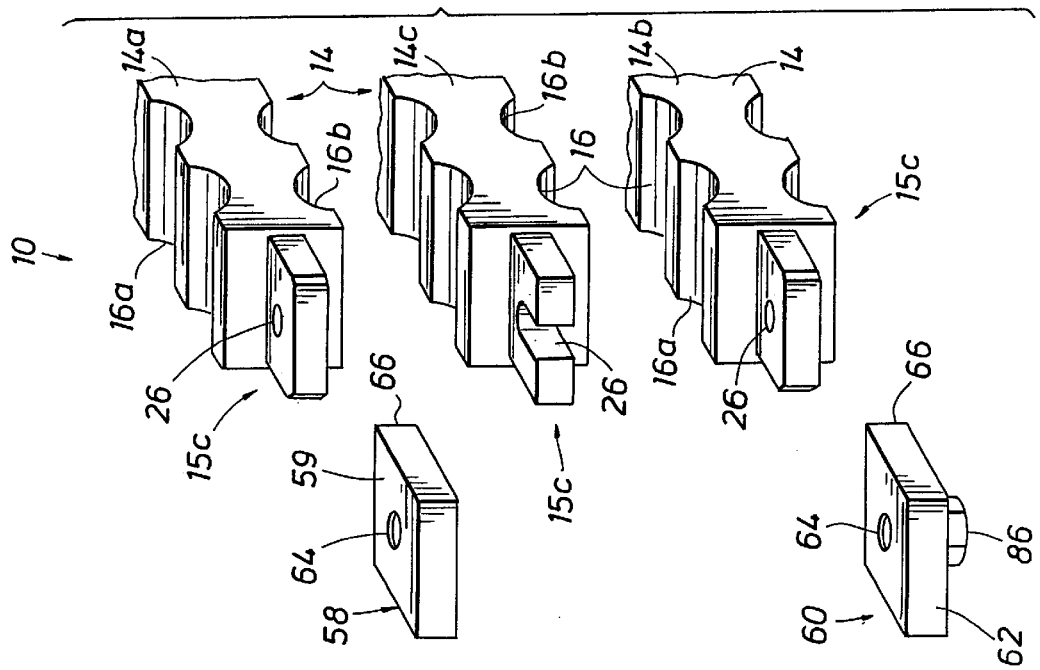
FIG. 15 is a detailed exploded view of an embodiment of a holding system being assembled in accordance with the present invention.

Methods for using the present invention to hold, store and/or ship elongated members will now be described with reference to FIGS. 15 and 16. The holding system 10 may be arranged in any of a variety of configurations for holding, storing or shipping one or more elongated members 12. Upper and lower support members 14a, 14b are positioned one over the other in general vertical alignment. If one or more intermediate support members 14c are used, they are positioned in generally stacked or parallel relationship between the upper and lower support members 14a, 14b. In any case, the support members 14 should be arranged such that there are one or more pairs of opposing carrier surfaces 16a, 16b on adjacent support members 14 that face one another, referred to herein as "facing carrier surfaces." Each elongated member 12 to be held in the holding system 10 is placed upon one of the facing carrier surfaces 16, or between a pair of facing carrier surfaces 16. Alternately, the desired or necessary number of support members 14 are placed between one or more layers of one or more adjacent elongated members 12.

After the elongated members 12 are in position between facing carrier surfaces 16 of adjacent support members 14, a connector assembly 50 is attached to the support members 14 and locked in place, securing the support members 14 together, securely engaging the opposing carrier surfaces 16 with the corresponding elongated members 12. Depending upon the overall configuration of the holding system 10, additional connector assemblies 50 may also be connected to the support members 14. For example, in the embodiment of FIG. 1, a first connection assembly 50 is attached to the ends 15c of the support members 14 and a second connection assembly 50 is attached to the ends 15d of the support members 14.

The method of use of the particular connection assembly 50 of FIGS. 1, 15 and 16 will now be described. If the locking member 90 that will be connected with the lower end 54b of the connector 54 is not integrally formed into the lower sleeve 60, such as, for example, a nut 92 (FIG. 7), the locking member 90 is placed into the cup-shaped portion 86 of the lower sleeve 60. The lower sleeve 60 is positioned upon an end 15c, 15d of the lower support member 14b and the passage 64 of sleeve 60 is aligned with the passageway 26 of the support member 14b. The upper sleeve 58 is similarly positioned upon an end 15c, 15d of the upper support member 14a and the passage 64 of sleeve 58 aligned with the passageway 26 of support member 14a.

The end 54b of connector 54 is passed through the aligned respective passages 64 of sleeves 58, 60 and passageways 26 of support members 14a, 14b, as well as through the corresponding passageways 26 of any intermediate support members 14c. The end 54b of connector 54 is then engaged with the locking member 90 (FIG. 7) associated with the lower sleeve 60. For example, when the locking member 90 is a nut 92 disposed within the cup-shaped portion 86 of the lower sleeve 60 (FIG. 7), the connector 54 is rotated to engage its threaded end 54b with the nut 92. The opposite end 54a of the connector 54 is connected with its corresponding locking member 90. In the illustrated embodiment, nut 92 is screwed onto threaded end 54a of connector 54. The connector 54 and locking members 90 are tightened to the desired degree, thus connecting the support members 14 and rigidly holding the support members 14 and elongated members 12 carried thereby, with locking members 90 bearing against bars 22 of respective support members 14a, 14b. For the embodiment of FIG. 1, the above method of use of the connection assembly 50 is performed for each of the two connection assemblies 50.

In various configurations of the present invention involving the use of more than one holding assembly 10, the above methods are conducted for each holding assembly 10 used. Further, it should be understood that the methods of the present invention are not limited to being performed in any particular order.

Each of the foregoing aspects and features of the invention may be used alone or in combination with other such aspects and features. The embodiments described herein are exemplary only and are not limiting of the invention, and modifications thereof can be made by one skilled in the art without departing from the spirit or teachings of this invention. Many variations and modifications of the embodiments described herein are thus possible and within the scope of the invention. Accordingly, the scope of protection is not limited to the embodiments described herein.

What is claimed is:

1. An apparatus capable of connecting a threaded rod and a nut to a support having a passage, comprising:
  a body having an opening capable of receiving the support and an aperture transverse of said opening and capable of receiving the threaded rod and passing the rod through the support passage;
  said body further including an extending portion having a cavity accessible through said aperture, said cavity capable of housing the nut in alignment with said passage; and
  said extending portion having one or more surfaces engageable with the nut to prevent the nut from rotating within said cavity.

2. The apparatus of claim 1 wherein said body and said extending portion are constructed of least of partially non-metallic material.

3. The apparatus of claim 1 wherein said surfaces are flats formed by said cavity.

4. The apparatus of claim 1 wherein said extending portion is formed of a material that will not substantially deform under the torque required to connect the threaded rod and the nut to the support member.

5. The apparatus of claim 1 wherein said body includes at least one reinforcing portion.

6. The apparatus of claim 5 wherein said body includes a plurality of surfaces forming said opening, wherein said reinforcing portion includes one or more runners disposed at least partially along a surface of said opening.

7. The apparatus of claim 5 wherein said body includes at least one outer edge, wherein said reinforcing portion includes at least one built-up portion disposed upon said outer edge.

8. The apparatus of claim 1 wherein said extending portion has an outer surface and includes at least one reinforcing portion.

9. The apparatus of claim 8 wherein said extending portion includes a plurality of outer surfaces, wherein said reinforcing portion includes one or more bosses disposed upon and extending from at least one of said outer surfaces.

10. The apparatus of claim 8 wherein said reinforcing portion includes at least one rib extending from the outer surface of said extending portion.

11. The apparatus of claim 8 wherein said reinforcing portion includes at least one rib extending between said body and said extending portion.

12. An apparatus capable of connecting a threaded rod and a nut to a support having a passage, comprising:

a body having an opening capable of receiving the support and an aperture capable of receiving the threaded rod;

said body further including an extending portion having a cavity accessible through said aperture, said cavity capable of housing the nut in alignment with said passage;

said extending portion having one or more surfaces engageable with the nut to prevent the nut from rotating within said cavity;

said body and said cavity being constructed at least partially of non-metallic material.

13. An apparatus for connecting a threaded rod and nut to a support having a passage therethrough, comprising:

a housing having an opening adapted to receive one end of the support and an aperture traversing said opening and adapted to receive the threaded rod;

an extension on said housing forming a cavity adjacent said aperture, said cavity adapted to house the nut in alignment with said aperture and passage; and said extension having at least one surface engageable with the nut to prevent the nut from rotating within said cavity as the rod is threaded onto the nut.

14. The apparatus of claim 13 wherein said extension is integral to said housing.

15. The apparatus of claim 13 wherein said housing and extension are made of a non-metallic material.

16. The apparatus of claim 13 wherein said aperture is sized to receive the nut.

17. The apparatus of claim 13 wherein said extension includes a mouth aligned with said aperture and a base opposite said mouth, said base having a bore sized to receive the rod and forming a shoulder to support the nut.

18. The apparatus of claim 13 wherein said housing and extension are made of polyethylene.

19. The apparatus of claim 13 wherein at least one reinforcing portion extends from said housing to said extension.

20. The apparatus of claim 13 wherein said housing includes opposing sides receiving the end of the support, said aperture passing through said opposing sides and in alignment with the passage in the support.

21. An apparatus capable of connecting a threaded rod and a nut to a support having a passage, comprising:

a body having an opening capable of receiving the support and an aperture capable of receiving the threaded rod;

an extending portion connected to said body and having a cavity accessible through said aperture, said cavity capable of housing the nut in alignment with said passage;

said extending portion having one or more surfaces engageable with the nut to prevent the nut from rotating within said cavity;

said body and said cavity being constructed of at least partially of a non-metallic material; and said body and said cavity being constructed of between about 60% and about 80% nylon material and between about 20% and about 30% glass material.

22. An apparatus capable of connecting a threaded rod and a nut to a support having a passage, comprising:

a body having an opening capable of receiving the support and an aperture capable of receiving the threaded rod;

an extending portion connected to said body and having a cavity accessible through said aperture, said cavity capable of housing the nut in alignment with said passage;

said extending portion having one or more surfaces engageable with the nut to prevent the nut from rotating within said cavity;

said extending portion being formed of a material that will not substantially deform under the torque required to connect the threaded rod and the nut to the support member; and said extending portion being constructed of high density polyethylene.

* * * * *